(12) United States Patent
Buecher et al.

(10) Patent No.: US 7,117,085 B2
(45) Date of Patent: Oct. 3, 2006

(54) METHOD OF EXCHANGING NAVIGATION INFORMATION

(75) Inventors: Andreas Buecher, Osterrode (DE);
Arne Friedrichs, Braunschweig (DE);
Gerd Draeger, Braunschweig (DE);
Volker Skwarek, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 230 days.

(21) Appl. No.: 10/467,810

(22) PCT Filed: Jan. 19, 2002

(86) PCT No.: PCT/DE02/00161

§ 371 (c)(1),
(2), (4) Date: Jan. 23, 2004

(87) PCT Pub. No.: WO02/065056

PCT Pub. Date: Aug. 22, 2002

(65) Prior Publication Data

US 2004/0111214 A1 Jun. 10, 2004

(30) Foreign Application Priority Data

Feb. 9, 2001 (DE) ................. 101 05 897

(51) Int. Cl.
*G01C 21/30* (2006.01)

(52) U.S. Cl. .............. 701/209; 701/201; 701/300; 342/357.09

(58) Field of Classification Search .............. 701/201, 701/208, 209, 207, 213, 211, 212, 200, 300; 340/995.1; 342/357.09
See application file for complete search history.

(56) References Cited

U.S. PATENT DOCUMENTS

| | | | |
|---|---|---|---|
| 6,035,253 A * | 3/2000 | Hayashi et al. ............ 701/211 |
| 6,278,941 B1 | 8/2001 | Yokoyama | |
| 2001/0027374 A1 * | 10/2001 | Hashimoto ................ 701/208 |

FOREIGN PATENT DOCUMENTS

| | | |
|---|---|---|
| DE | 196 51 146 | 6/1998 |
| WO | 00 66975 | 11/2000 |

* cited by examiner

*Primary Examiner*—Gertrude A. Jeanglaude
(74) *Attorney, Agent, or Firm*—Kenyon & Kenyon LLP

(57) ABSTRACT

A method of exchanging navigation information between a terminal, an offboard vehicle navigation device in particular, and a control center is described, the navigation information including route information for at least one route between a starting point and a destination. The method involves the following steps: a) verifying a starting point reference ID and/or starting coordinates and verifying a destination reference ID and/or destination coordinates and b) calculating route data and transmitting to the terminal a route response containing at least parts of the route data, the route data corresponding to at least one complete route from the starting point to the destination or at least one partial route from the starting point to an intermediate point located between the starting point and the destination at least as a function of the length of the route from the starting point to the destination.

16 Claims, 5 Drawing Sheets

METHOD OF EXCHANGING NAVIGATION INFORMATION

FIELD OF THE INVENTION

The present invention relates to a method of exchanging navigation information between a terminal, an offboard vehicle navigation device in particular, and a control center, the navigation information including route information for at least one route between a starting point and a destination.

BACKGROUND INFORMATION

It is known that for a route search, a connection between a starting point and a destination is searched according to specific criteria. To this end, it is necessary to enter route guidance information elements that define at least the starting point and destination. Such an entry may be made, for example, using a keyboard connected to a vehicle navigation device. If the vehicle navigation device includes a route guidance element database, it is possible to immediately verify the route guidance element data entered by comparing it with the entries of the route guidance element database. Novel vehicle navigation devices that are, for example, described as hybrid vehicle navigation devices or as offboard vehicle navigation devices, do not provide a complete route guidance element database within the navigation device. Moreover, in such vehicle navigation devices, the route search procedure is located outside the vehicle navigation device and is performed in a control center. There are known offboard navigation methods that transmit a route between a starting point and a destination. However, these known methods do not make it possible to enter a destination offline and are not capable of segmenting routes or updating the calculated route in an abbreviated procedure during the route guidance procedure.

SUMMARY OF THE INVENTION

The fact that the following steps are provided in the method according to the present invention:
a) verifying a starting point reference ID and/or starting coordinates and verifying a destination reference ID and/or destination coordinates and
b) calculating route data and transmitting to the terminal a route response containing at least parts of the route data, the route data corresponding to at least one complete route from the starting point to the destination or at least one partial route from the starting point to an intermediate point located between the starting point and the destination at least as a function of the length of the route from the starting point to the destination, makes a segmented transmission of routes and route corridors possible, which makes it possible to include present traffic influences and/or disturbances. Moreover, the transmission time may be adjusted by segmenting the route based on the needs of the terminal. This also applies in particular in the event of wrong trips for the transmission of alternative routes.

In the method according to the present invention, it is preferably further provided that the intermediate point has a verified intermediate point reference ID and/or verified intermediate point coordinates. In the present context, verified reference IDs or verified coordinates are understood to be reference IDs or coordinates that may be unambiguously assigned to corresponding route guidance database entries, which are stored in a database to which the control center has access.

In connection with the verified intermediate point reference ID and/or the verified intermediate point coordinates, the method according to the present invention preferably also provides that the verified intermediate point reference ID and/or the verified intermediate point coordinates are transmitted from the control center to the terminal. Such a transmission of content specific to the control center makes the transmission of new route queries shorter. Moreover, it is not necessary for the user to re-enter the destination.

In the method according to the present invention, it is preferably also provided that the terminal is a mobile terminal and that additional route data is requested from the control center via the terminal or via a separate device before the intermediate point is reached, the additional route data corresponding either to at least a complete route from the intermediate point to the destination or at least to a partial route from the intermediate point to an additional intermediate point. Of course, the method according to the present invention is not limited to subdividing the route into three partial routes, but instead a subdivision into more than three partial routes is possible. The number of the partial routes and the length of the partial routes may be adapted to the length of the total route in particular. In short routes in particular, it may be advantageous not to subdivide the route at all, but instead to transmit the complete route data directly to the terminal or to the separate device.

Moreover, the method according to the present invention provides that the mobile terminal or the separate device transmits the verified intermediate point reference ID and/or the verified intermediate point coordinates to the control center if additional route data is requested. To this end, in the route calculation, the control center selects only those intermediate points to which it is possible to unambiguously assign corresponding route guidance-database entries, so that the corresponding reference IDs and/or the corresponding coordinates are immediately available.

In addition or as an alternative, it may be provided in the method according to the present invention that the control center also transmits an unambiguous route ID to the terminal or to a separate device in step b).

In this connection, it is preferably also provided that the mobile terminal or the separate device transmits the route ID to the control center if additional route data is requested. This makes it possible to simplify the access to already calculated route data in the control center. Moreover, it is also conceivable, for example, to use such route IDs for the calculation of the services provided by the control center.

In a preferred embodiment, the method according to the present invention also provides that step a) includes the following sub-steps:
a1) transmission of an address resolution query to the control center,
a2) transmission of an address resolution response from the control center to the terminal or to a separate device and
a3) transmission of a route query to the control center.

Before step a1) is implemented, the user preferably enters route guidance element data that relates at least to one route guidance element. The route guidance element data entered is then transferred to the control center by the address resolution query, preferably via an online connection between the terminal and the control center. The verification of the starting point reference ID and/or the verification of the starting coordinates and the verification of the destination reference ID and/or the verification of the destination coordinates may then be performed, for example, by a multistage communication process between the control center and the terminal. If, for example, it is not possible to unambiguously assign several route guidance elements such as, for example, city or street names, to corresponding database entries, the control center may return a selection of database entries from which the user may then select the correct entry. In this connection, it is possible to transmit the corresponding reference IDs directly with the selection or not to transmit the reference ID for an entry selected until the user has selected a response to the selection.

In the method according to the present invention, it is also preferably provided that one parameter or a plurality of the following parameters are transmitted to the control center in step a1) or in step a2):

- geographic coordinates,
- one address or a plurality of addresses as a set of attributes such as city, street, house number, zip code,
- one reference ID or a plurality of reference IDs already verified in the control center,
- one telephone number or a plurality of telephone numbers,
- one map segment or a plurality of map segments,
- geometric road descriptions,
- one text description or a plurality of text descriptions,
- one sound recording or a plurality of sound recordings,
- photographic and/or video recordings,
- customer information, a user/use profile in particular such as vehicle type, speed range, route optimization wishes.

With respect to sub-step a2), the method according to the present invention also preferably provides that one parameter or a plurality of the following parameters are transmitted:

- unambiguous or partially unambiguous reference IDs for the individual addresses or their sub-attributes such as city, street, house number, zip code,
- time information as a set of attributes such as year, month, day, hour, minute, second,
- message time stamp,
- desired travel time.

Such an implementation of sub-steps a1) and a2) results in a flexible and convenient user interface for the entry of route guidance element data to verify starting points and destinations.

The method according to the present invention preferably also provides that in step a3) the unambiguously verified starting point reference ID and/or the unambiguously verified starting coordinates and the unambiguously verified destination reference ID and/or the unambiguously verified destination coordinates are transmitted in order to be able to perform the route calculation based on unambiguous information.

In this connection, the method according to the present invention may also provide that in step a3), one information item or a plurality of the following information items are transmitted:

- one abort criterion or a plurality of abort criteria for the route calculation, in particular maximum data volume, maximum waiting time until data transfer, distance,
- coding of terminal capabilities, in particular with reference to the display capabilities and/or the audio capabilities,
- user preferences, in particular the type of desired supplemental information in the route data,
- time information as a set of attributes such as year, month, day, hour, minute, second,
- personalized driving profile,
- traffic information and/or route disturbances (for example, manual, Traffic Message Channel (TMC), etc).

The transmission of the route response to the terminal performed in connection with step b) preferably includes one information item or a plurality of the following information items in the method according to the present invention.

- supplemental map attributes, in particular distances and/or trip time, street/road classes, street names, graphic and or acoustic route guidance instructions,
- images, photographic and/or video recordings,
- sound recordings,
- traffic reports,
- supplemental information such as advertising
- data header information, in particular language and/or country identification, reference system, coding used, coordinate coding, route data format, flags concerning existing supplemental attributes,
- time information as a set of attributes such as year, month, day, hour, minute, second,
- message time stamp,
- travel time.

In connection with the method according to the present invention, it is preferably also provided that verified starting point reference IDs and/or verified starting coordinates and/or verified destination reference IDs and/or verified destination coordinates are stored in the terminal and/or in the separate device. In this manner, it is possible to build up a data set requiring only a small amount of storage space for frequently used starting points and destinations.

In a similar manner, it may be provided in the method according to the present invention that user-dependent and/or terminal-dependent verified starting point reference IDs and/or verified starting coordinates and/or verified destination reference IDs and/or verified destination coordinates are stored in the control center. This data may be made available, for example, to a user or to a terminal after the user or the terminal has appropriately identified himself or itself, it also being possible in this case to implement a type of personal address book.

In the method according to the present invention, it is preferably also provided that one sub-step or a plurality of sub-steps a1), a2) and a3) are repeated if no response is received after a predetermined time span. To this end, appropriate time counters may be started at defined points in time, the corresponding sub-step being repeated after their expiration.

In the method according to the present invention, it may be provided that the separate device is embodied as a mobile telecommunications terminal. In this connection, it is possible, for example, to implement one step or a plurality of steps a1), a2) and a3) using a cellular phone, for example, via SMS messages.

Furthermore, it may be provided that the separate device is embodied as a computer, for example, a computer connected to the Internet. At the end of the communication process between the computer and the control center, a route ID, for example, may then be transmitted from the control center to the computer, it being possible to provide such route IDs, for example, to be entered by the user into a vehicle navigation device in order to download a route already calculated at this point in time.

The method according to the present invention may provide that sub-steps a1) and a2) are repeated in alternation until at least one starting point reference ID and/or starting coordinates and one destination reference ID and/or destination coordinates are verified, specifically independent of whether the communication between the control center and the terminal occurs in the form of a vehicle navigation device, a mobile telecommunications device or a computer.

In some embodiments of the method according to the present invention, it may be provided that sub-step a2) is only executed if a starting point reference ID and/or starting coordinates and a destination reference ID and/or destination coordinates have not yet been verified. For example, it is possible that a user may directly request a route with unambiguous reference IDs that are requested, for example, from a list stored in the terminal. It is likewise conceivable that the route guidance element data entered by the user is unambiguous. In such a case, to speed up the method, it may be provided that the control center responses directly by transmitting the route data.

The same applies to each terminal, each vehicle navigation device in particular, that is designed to participate in the method according to the present invention.

BRIEF DESCRIPTION OF THE DRAWINGS

The invention will be explained in greater detail below with reference to the associated drawing.

FIG. 1 shows an example of a message sequence in an error-free sequence executed by one embodiment of the method according to the present invention, the meaning of the reference numerals BZ used in FIG. 1 being obtained from the following Table 1.

TABLE 1

| BZ | Meaning |
| --- | --- |
| 101 | Terminal |
| 102 | Central processing unit |
| 103 | Address resolution query (address) |
| 104 | Time counter |
| 105 | Address resolution |
| 106 | Address resolution response ([partially] resolved addresses) |
| 107 | User selection |
| 108 | The above sequence is repeated until it has been possible to resolve the address unambiguously. |
| 109 | Route query (start, destination) |
| 110 | Time counter |
| 111 | Route calculation |
| 112 | Route response ([partial] route) |
| 113 | Route guidance |
| 114 | Route query (start, destination) |
| 115 | Since the central processing unit generally subdivides the route into several segments, the terminal must make several route queries before the destination is reached. |
| 116 | Time counter |
| 117 | Route calculation |
| 118 | Route response ([partial] route) |

Figure 1:
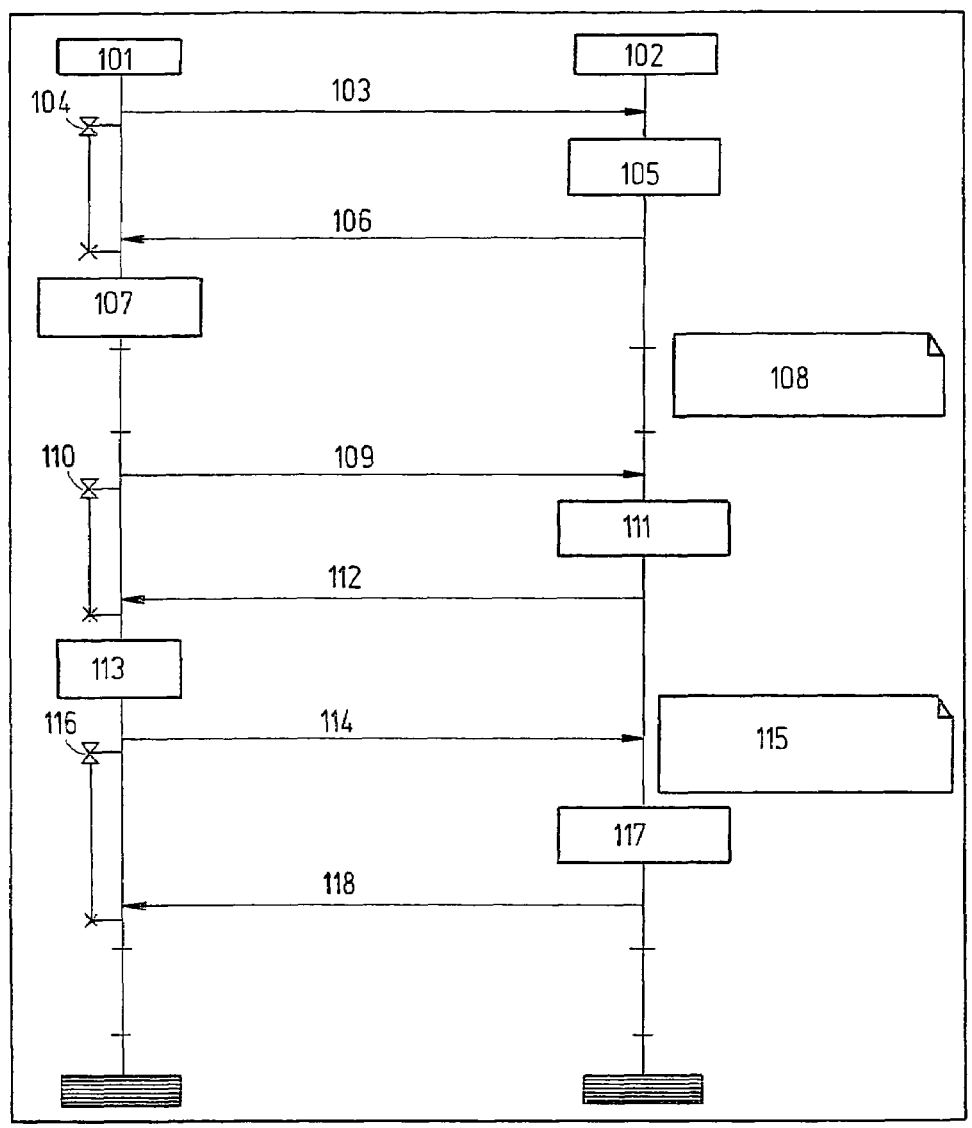
FIG. 1 shows an example of a message sequence in an error-free operating sequence of one embodiment of the method according to the present invention.

According to the depiction of FIG. 1, the following sequence occurs: First, a terminal 101, an offboard vehicle navigation device, for example, sends an address resolution query 103 to central processing unit 102. The address resolution query contains route guidance element data entered by the user in a suitable manner. The route guidance element data may include, for example, city and street names in the presumed or abbreviated notation. This data may be entered using a keyboard, a voice input device or in any suitable manner. Central processing unit 102 performs the address resolution in block 105. To this end, central processing unit 102 compares, for example, the route guidance element data transmitted with address resolution query 103 with the database entries available in central processing unit 102 in order to verify a starting point reference ID and/or starting coordinates and a destination reference ID and/or destination coordinates to the extent possible based on the route guidance elements transmitted. If it is not possible to assign an unambiguous reference ID to one route guidance element or a plurality of route guidance elements, the most probable database entries with respect to this route guidance element are combined, for example, into a list. After the address resolution, central processing unit 102 transmits an address resolution response 106 to terminal 101. Terminal 101 monitors the on-time arrival of the address resolution response by starting a time counter 104 shortly after address resolution query 103 is sent; the time counter is set to a predefined value. In the case shown, address resolution response 106 arrives before the expiration of time counter 104, as is depicted by the horizontal position of the corresponding arrow and the expiration of time counter 104, which is denoted by an "x". Address resolution response 106 contains the already unambiguously verified reference IDs and one list or a plurality of lists for the route guidance elements that have not yet been unambiguously verified. In block 107, the user may make an appropriate choice from these lists in order to complete the set of reference IDs. Block 108 only contains the indication that the operating sequence depicted is repeated until it has been possible to resolve the addresses unambiguously. After all reference IDs are present, terminal 101 starts a route query 109, for example, by sending a verified starting point reference ID and a verified destination reference ID to central processing unit 102. Based on this data, central processing unit 102 performs a route calculation. In the case depicted, the route has a length from start to destination which prompts central processing unit 102 to first calculate only one partial route. After the partial route is calculated, control center unit 102 sends a route response 112 to terminal 101, route response 112 containing corresponding route data for the partial route. Furthermore, the route response preferably contains an intermediate point reference ID, which unambiguously identifies the intermediate point that determines the end point of the partial route. Terminal 101 monitors the (on-time) arrival of route query 112 by starting a time counter 110 shortly after route query 109 has been sent. In the case depicted, however, route response 112 arrives before the expiration of time counter 110, as can be seen in the depiction of FIG. 1. In block 113, terminal 101 starts the route guidance. Shortly before terminal 101 has reached the intermediate point, it sends a new route query 114 to central processing unit 102. Block 115 contains the indication that the central processing unit generally subdivides the route into several segments so that the terminal must makes several route queries before the destination is reached. Route query 114 preferably contains the intermediate point reference ID, which central processing unit 102 may use as a new starting point for the route calculation. Central processing unit 102 performs such a route calculation in block 117. As a response to route query 114, central processing unit 102 sends an additional route response 118 to terminal 101, route response 118 containing route data for the remaining route or an additional intermediate route. Terminal 101 monitors the (on-time) arrival of route response 118 by starting a time counter 116 shortly after route query 114 has been sent. In the case depicted, however, route response 118 arrives on time. Subsequently, it is possible for the terminal to continue the route guidance, which, however, is no longer shown in FIG. 1.

Figure 2:
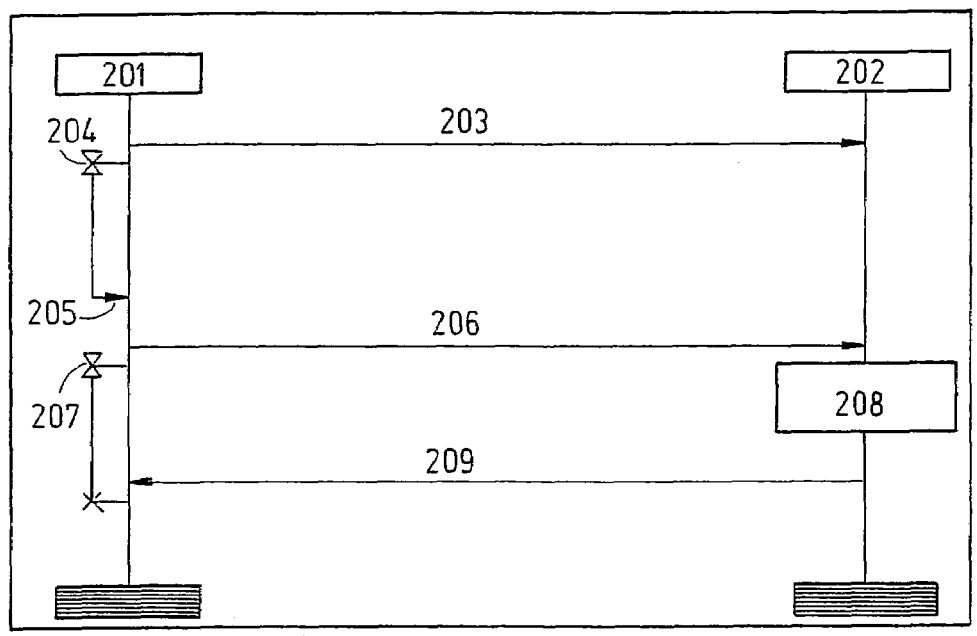
FIG. 2 shows an example of the operating sequence of one embodiment of the method according to the present invention in which a time counter expires after the address resolution query is transmitted.

FIG. 2 shows an example of the operating sequence of one embodiment of the method according to the present invention in which a time counter expires after the address resolution query is transmitted, the meaning of the reference numerals BZ used in FIG. 1 being obtained from the following Table 2.

TABLE 2

| BZ | Meaning |
| --- | --- |
| 201 | Terminal |
| 202 | Central processing unit |
| 203 | Address resolution query (address) |
| 204 | Time counter |
| 205 | Time counter cycle 204 completed |
| 206 | Address resolution query (address) |
| 207 | Time counter |
| 208 | Address resolution |
| 209 | Address resolution response ([partially] resolved addresses) |

According to the depiction of FIG. 2, the following operating sequence occurs: A terminal 201 sends an address resolution query 203 to a central processing unit 202. The address resolution query may be an address resolution query corresponding to address resolution query 103 of FIG. 1. Shortly after address resolution query 203 is sent, terminal 201 starts a time counter 204 in order to check the (on-time) arrival of an address resolution response. According to the depiction of FIG. 2, time counter 204 expires before an address resolution response is received from central processing unit 202. Therefore, after the expiration of time counter 204, terminal 201 sends a new address resolution query 206 to central processing unit 202. Shortly after this address resolution query 206 is sent, terminal 201 restarts a time counter 207. The address resolution takes place in block 208. Subsequent to the address resolution, central processing unit 202 sends an address resolution response 209 to terminal 201, in this case before the expiration of time counter 207. The further operating sequence may then correspond to that shown in FIG. 1.

Figure 3:
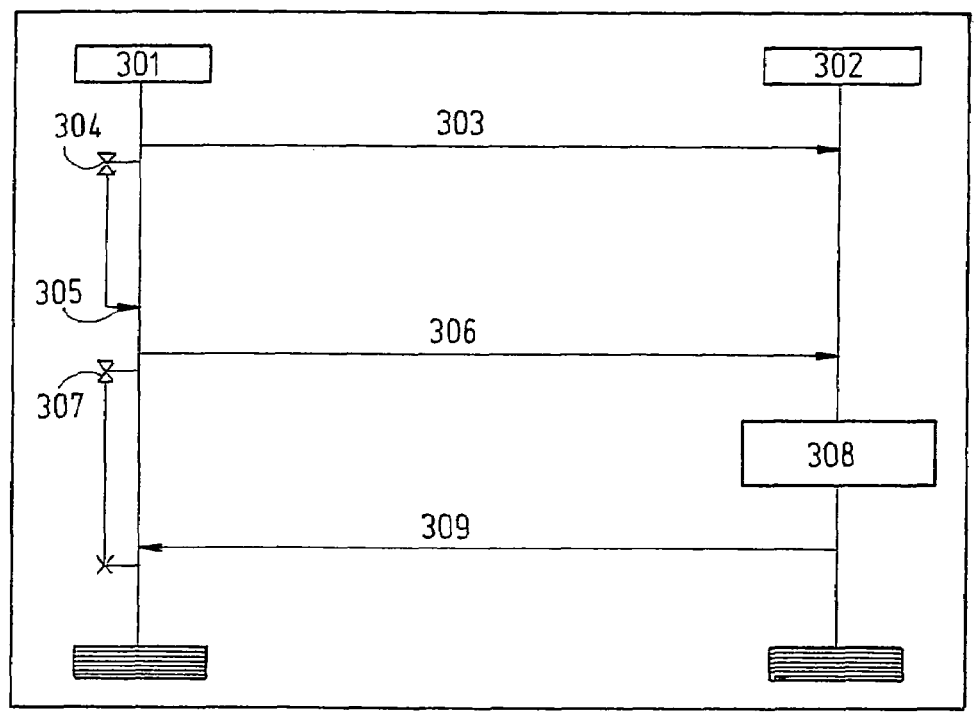
FIG. 3 shows an example of the operating sequence of one embodiment of the method according to the present invention in which a time counter expires after a route query is transmitted.

FIG. 3 shows an example of the sequence of an embodiment of the method according to the present invention in which a time counter expires after a route query is transmitted, the meaning of the reference numerals BZ used in FIG. 3 being obtained from the following Table 3.

TABLE 3

| BZ | Meaning |
| --- | --- |
| 301 | Terminal |
| 302 | Central processing unit |
| 303 | Route query (start, destination) |
| 304 | Time counter |
| 305 | Time counter cycle 304 completed |
| 306 | Route query (start, destination) |
| 307 | Time counter |
| 308 | Route calculation |
| 309 | Route response ([partial] route) |

According to the depiction of FIG. 3, the following operating sequence occurs: A terminal 301 sends a route query 303 to a central processing unit 302. Shortly after route query 303 is sent, terminal 301 starts a time counter 304 to check the (on-time) arrival of a corresponding route response. In the case depicted, central processing unit 302 does not send a route response to route query 303 due, for example to a temporary overload. Therefore, after time counter 304 has expired, terminal 301 sends a new route query 306 to central processing unit 302, which then performs a route calculation for a complete route or a partial route in block 308 and then transmits a route response 309 to terminal 301, which arrives at terminal 301 before the expiration of time counter 307. The further operating sequence may then correspond to the one shown in FIG. 1.

Figure 4:
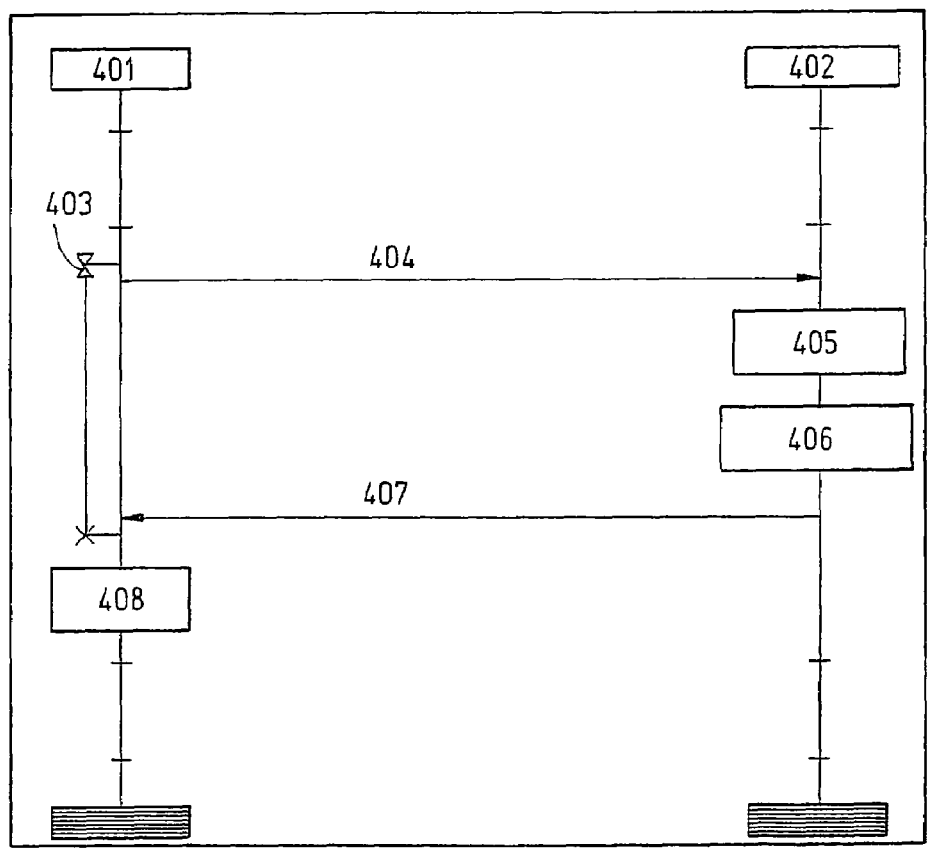
FIG. 4 shows an example of the operating sequence of one embodiment of the method according to the present invention in which the route calculation is made immediately after an unambiguous address resolution.

FIG. 4 shows an example of the operating sequence of one embodiment of the method according to the present invention in which the route calculation is performed immediately after an unambiguous address resolution, the meaning of the reference numerals BZ used in FIG. 4 being obtained from the following Table 4.

TABLE 4

| BZ | Meaning |
| --- | --- |
| 401 | Terminal |
| 402 | Central processing unit |
| 403 | Time counter |
| 404 | Address resolution query (address) |
| 405 | Address resolution |
| 406 | Route calculation |
| 407 | Route response ([partial] route) |
| 408 | Route guidance |

According to the depiction of FIG. 4, the following operating sequence occurs: A terminal 401 sends an address resolution query 404 to a central processing unit 402. In block 405, central processing unit 402 performs an address resolution. In the case depicted in FIG. 4, address resolution query 404 has contained route guidance element data that makes a complete resolution of the address possible. Therefore, central processing unit 402 performs a route calculation in block 406 that may affect the complete route or segments of a route without an address resolution query being sent to terminal 401. Instead, central processing unit 402 directly sends a route response 407 to terminal 401. The (on-time) arrival of a reply is then checked by terminal 401 using a time counter 403. The route guidance may already be started in block 408. Although this is not shown in FIG. 4, additional partial routes may of course also be requested and calculated in this case.

Figure 5:
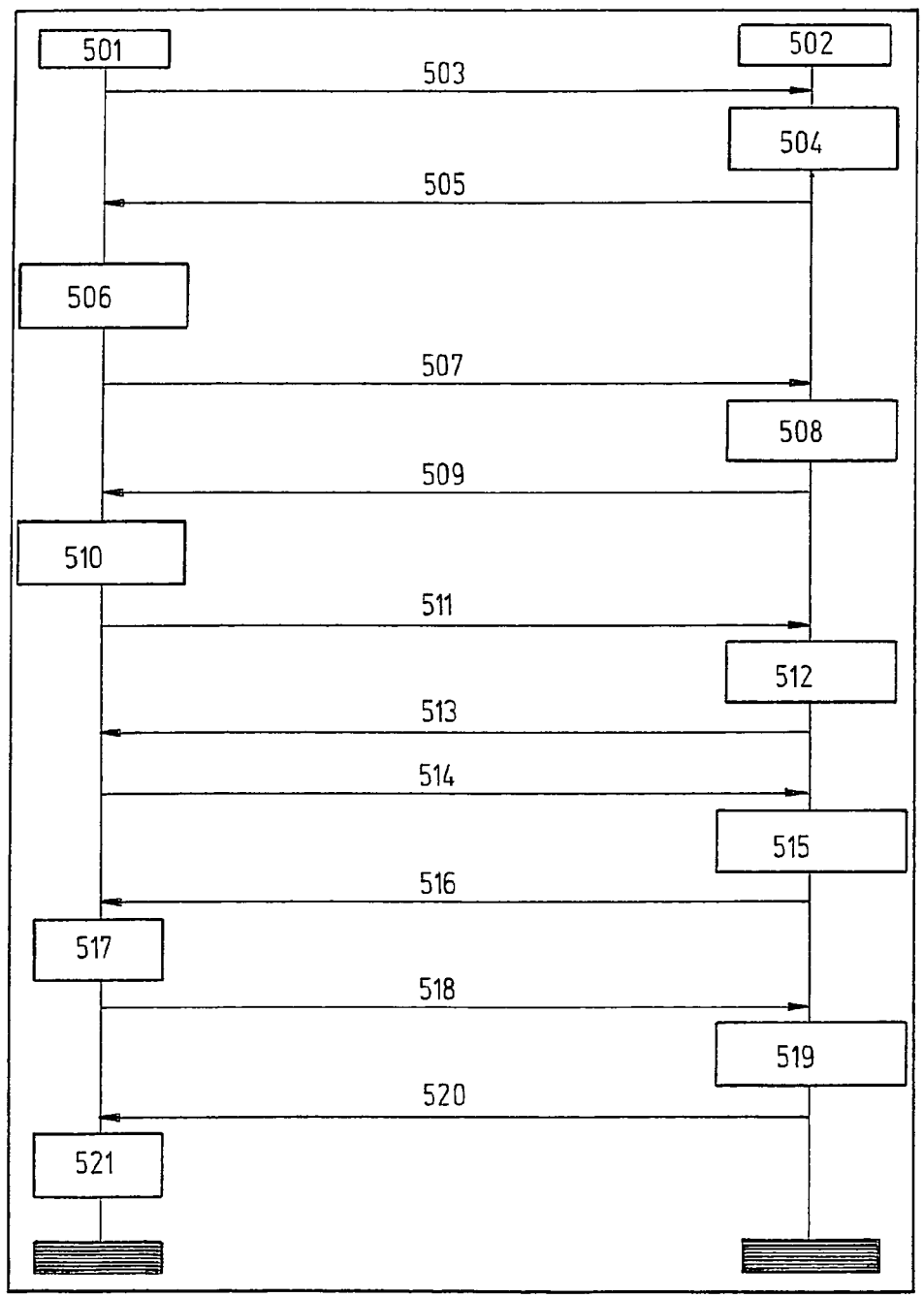
FIG. 5 shows an example of the operating sequence of one embodiment of the method according to the present invention under practical conditions.

FIG. 5 shows an example of the operating sequence of one embodiment of the method according to the present invention under practical conditions, the meaning of the reference numerals BZ used in FIG. 5 being obtained from the following Table 5.

TABLE 5

| BZ | Meaning |
| --- | --- |
| 501 | Terminal |
| 502 | Central processing unit |
| 503 | Address resolution query (city = "Braunschweig" street = "Heirichstrasse") |
| 504 | Address resolution |
| 505 | Address resolution response<br>(City = "Braunschweig", ID = 5000<br>Street = "Heinrich-Heine Strasse", ID = 1234<br>Street = "Heinrichstrasse", ID = 2345<br>. . .<br>City = "Brauchsdorf", ID = 9876<br>City = "Braunsdorf", ID = 8765<br>. . . ) |
| 506 | User selection |
| 507 | Address resolution query (ID = 2345) |
| 508 | Address resolution |

TABLE 5-continued

| BZ | Meaning |
|---|---|
| 509 | Address resolution response<br>(city = "Braunschweig", street = Heinrichstrasse", ID = 2345<br>Cross street = "Südstrasse", ID = 23451<br>Cross street = "Nordstrasse", ID = 23452<br>Cross street = "Weststrasse", ID = 23453 |
| 510 | User selection |
| 511 | Address resolution query (coordinates = 52.123/10.234) |
| 512 | Address resolution |
| 513 | Address resolution response (ID = 777777) |
| 514 | Route query (StartID = 777777, DestinationID = 23453) |
| 515 | Route calculation |
| 516 | Route response (route data, intermediate destination ID = 12345) |
| 517 | Routeguidance |
| 518 | Route query (StartID = 12345, DestinationID = 23453) |
| 519 | Route calculation |
| 520 | Route response (route data) |
| 521 | Route guidance |

According to the depiction of FIG. 5, the following operating sequence occurs: A terminal 501 sends an address resolution query 503 to a central processing unit 502. Address resolution query 503 contains the route guidance element data City="Braunschweig," Street="Heirichstrasse." The user has, however, made an error in entering the street name because he actually intended to enter "Heinrichstrasse." Central processing unit 502 starts the address resolution in block 504. In doing so, the database entries "Braunschweig" and "Braunsdorf" are selected as the most probable entries. The entries "Heinrich-Heine Strasse" and "Heinrichstrasse" are found for the street name "Heirichstrasse." These database entries are transferred together with the corresponding IDs specified in Table 5 and with address resolution response 505 to terminal 501. The user selection is then made in Block 506. The user selects ID 2345, which corresponds to Heinrichstrasse in Braunschweig. ID 2345 is transmitted to central processing unit 502 via an additional address resolution query 507. The address resolution is continued in block 508. Central processing unit 502 sends the already confirmed information City="Braunschweig," Street="Heinrichstrasse," and ID 2345 as address resolution response 509. Furthermore, "Südstrasse," "Nordstrasse" and "Weststrasse" are transmitted as possible cross streets, each with an associated ID. In block 510, the user makes an additional user selection with respect to the cross street. He sends a new address resolution query 511 to central processing unit 502, address resolution query 511 containing coordinates=52.123/10.234. In block 512, the address resolution for the starting point is continued, it is resolved using the coordinates information. As address resolution response 513, central processing unit 502 sends the ID 777777 for the starting point. A starting point reference ID and a destination reference ID are then present in terminal 501, they are transmitted to central processing unit 502 in the event of a route query 514 from terminal 501. Based on these IDs, a partial route for the first route segment is calculated in block 515. Central processing unit 502 sends a route response 516 to terminal 501, route response 516 containing the route data for the first partial route and an intermediate point reference ID=12345. The route guidance is then started in block 517. Preferably, shortly before the intermediate point is reached, terminal 501 sends a new route query to central processing unit 502. As a starting ID, route query 518 contains the previously transmitted intermediate point reference ID and the destination reference ID known through the address resolution. Based on these reference IDs, the route calculation for the remaining route is performed in block 519. Central processing unit 502 then sends a route response 520 to terminal 501, the route response containing the route data for the remaining route so that the route guidance may be continued in block 521.

All the entries required to implement the method according to the present invention are not limited to keyboard entries. For example, touch screen entries or voice entries come into consideration.

The term control center as used in the present application does not absolutely require that all components making up the control center be situated physically adjacent to each other. Instead, the control center may be made up of suitable hardware and software, the hardware components being interconnected by suitable LAN and/or WAN connections, the Internet in particular.

The term terminal is also understood to be a functional unit, in this case also it is not absolutely necessary for all components to be accommodated physically adjacent to each other in a housing, for example.

The above description of the exemplary embodiments according to the present invention is only intended to illustrate and not to limit the invention. Various changes and modifications are possible within the scope of the present invention without departing from the scope of the present invention and its equivalents.

The invention claimed is:

1. A method of exchanging navigation information between a terminal and a control center, the navigation information including route information for at least one route between a starting point and a destination, the method comprising:
   verifying at least one of a starting point reference ID and starting coordinates;
   verifying at least one of a destination reference ID and destination coordinates;
   calculating route data;
   transmitting to the terminal a route response containing at least a part of the route data, wherein the route data correspond to one of the at least one route and at least one partial route from a starting point to an intermediate point located between the starting point and the destination at least as a function of a length of the at least one route, and wherein the intermediate point has at least one of a verified intermediate point reference ID and verified intermediate point coordinates; and
   requesting additional route data from the control center via one of the terminal and a separate device before the intermediate point is reached, wherein:
   the terminal includes a mobile terminal, and
   the additional route data corresponding to one of a route from the intermediate point to the destination and a route from the intermediate point to an additional intermediate point.

2. The method as recited in claim 1, wherein:
   the terminal includes an offboard vehicle navigation device.

3. The method as recited in claim 1, further comprising:
   transmitting the at least one of the verified intermediate point reference ID and the verified intermediate point coordinates from the control center to the terminal.

4. The method as recited in claim 1, wherein:
   one of the mobile terminal and the separate device transmits at least one of the verified intermediate point reference ID and the verified intermediate point coordinates to the control center if the additional route data is requested.

5. The method as recited in claim 1, wherein:
the control center transmits an unambiguous route ID to one of the terminal and a separate device.

6. The method as recited in claim 1, wherein:
one of the mobile terminal and the separate device transmits a route ID to the control center if the additional route data is requested.

7. A method of exchanging navigation information between a terminal and a control center, the navigation information including route information for at least one route between a starting point and a destination, the method comprising:
verifying at least one of a starting point reference ID and starting coordinates;
verifying at least one of a destination reference ID and destination coordinates;
calculating route data;
transmitting to the terminal a route response containing at least a part of the route data, wherein the route data correspond to one of the at least one route and at least one partial route from a starting point to an intermediate point located between the starting point and the destination at least as a function of a length of the at least one route;
wherein the verifying of the at least one of the starting point reference ID and the starting coordinates includes:
transmitting an address resolution query to the control center,
transmitting an address resolution response from the control center to one of the terminal and a separate device, and
transmitting a route query to the control center.

8. The method as recited in claim 1, further comprising:
transmitting to the control center at least one of the following:
geographic coordinates,
at least one address as a set of attributes corresponding to city, street, house number, and postal code,
at least one of the starting point reference ID and destination reference ID already verified in the control center,
at least one telephone number,
at least one map segment,
geometric road descriptions,
at least one text description,
at least one sound recording,
at least one of photographic recordings and video recordings, and
customer information and a user/use profile including vehicle type, speed range, a route optimization preference.

9. The method as recited in claim 1, further comprising:
transmitting at least one of the following:
one of unambiguous reference IDs and partially unambiguous reference IDs for one of individual addresses and sub-attributes including city, street, house number, and zip code,
time information as a set of attributes including year, month, day, hour, minute, and second,
message time stamp, and
desired travel time.

10. The method as recited in claim 1, further comprising:
transmitting at least one of the starting point reference ID and the starting coordinates; and
transmitting at least one of the destination reference ID and the destination coordinates.

11. The method as recited in claim 1, further comprising:
transmitting at least one of the following:
at least one abort criterion for a route calculation and including maximum data volume, maximum waiting time until data transfer, and distance,
coding of terminal capabilities with reference to at least one of display capabilities and audio capabilities,
user preferences corresponding to type of desired supplemental information in the route data,
time information as a set of attributes including year, month, day, hour, minute, and second,
a personalized driving profile, and
at least one of traffic information and route disturbances.

12. The method as recited in claim 1, wherein the route response includes at least one of the following information items:
supplemental map attributes including distances, trip time, street classes, street names, route guidance instructions,
at least one of images, photographic recordings, and video recordings,
sound recordings,
traffic reports,
supplemental information including advertising,
data header information corresponding to language identification, country identification, reference system, coding used, coordinate coding, route data format, and flags concerning existing supplemental attributes,
time information as a set of attributes including year, month, day, hour, minute, and second,
message time stamp, and
travel time.

13. The method as recited in claim 1, further comprising:
storing in at least one of the terminal and a separate device at least one of:
the starting point reference ID,
the starting coordinates,
the destination reference IDs, and
the destination coordinates.

14. The method as recited in claim 1, further comprising:
storing in the control center at least one of:
the starting point reference ID,
the starting coordinates,
the destination reference IDs, and
the destination coordinates.

15. The method as recited in claim 1, wherein:
the separate device includes a mobile telecommunications terminal.

16. The method as recited in claim 1, wherein:
the separate device includes a computer.

* * * * *